US009535156B2

(12) United States Patent
Freed et al.

(10) Patent No.: US 9,535,156 B2
(45) Date of Patent: Jan. 3, 2017

(54) PASSIVE LISTENING PULSE ADAPTIVE SIDELOBE CANCELLER

(71) Applicant: SRC, Inc., North Syracuse, NY (US)

(72) Inventors: Shawn B. Freed, Syracuse, NY (US); Thomas J. Vitale, Jr., Syracuse, NY (US); Michael E. Murphy, Pulaski, NY (US)

(73) Assignee: SRC, INC., North Syracuse ( * ) Notice: Subject to any disclaimer, the term of this patent is extended or adjusted under 35 U.S.C. 154(b) by 352 days.

(21) Appl. No.: 14/215,476

(22) Filed: Mar. 17, 2014

(65) Prior Publication Data

US 2016/0139246 A1    May 19, 2016

Related U.S. Application Data

(60) Provisional application No. 61/800,062, filed on Mar. 15, 2013.

(51) Int. Cl.
*G01S 7/36* (2006.01)
*H04K 3/00* (2006.01)

(52) U.S. Cl.
CPC .. *G01S 7/36* (2013.01); *H04K 3/20* (2013.01)

(58) Field of Classification Search
CPC .................................. G01S 7/36; H04K 3/20
USPC ........................................................... 342/17
See application file for complete search history.

(56) References Cited

U.S. PATENT DOCUMENTS

| 5,371,506 A * | 12/1994 | Yu ............................. G01S 7/36 342/149 |
| 5,600,326 A | 2/1997 | Yu |
| 5,623,267 A * | 4/1997 | Wurman .............. G01S 13/003 342/26 D |
| 5,907,302 A | 5/1999 | Melvin |
| 6,150,976 A * | 11/2000 | Cooley ................ G01S 7/4052 342/165 |
| 6,531,976 B1 | 3/2003 | Yu |
| 6,867,726 B1 * | 3/2005 | Yu ........................ G01S 7/2813 342/149 |
| 7,199,753 B2 | 4/2007 | Pauplis |
| 2012/0218139 A1 | 8/2012 | Suzuki |

FOREIGN PATENT DOCUMENTS

| CN | 102944866 | 2/2013 |
| JP | 2012189543 | 10/2012 |
| WO | 2009092393 | 7/2009 |

OTHER PUBLICATIONS

Cook et al., Optimization of Waveform Diversity and Performance for Pulse-Agile Radar, Radar Systems and Remote Sensing Lab, University of Kansas, 2011.
Gerlach, Adaptive Canceler and Pulse Compressor Interactions, Transactions on Aerospace and Electronic Systems, 2011, vol. 72, No. 2.

* cited by examiner

*Primary Examiner* — Timothy A Brainard
(74) *Attorney, Agent, or Firm* — Bond Schoeneck & King, PLLC; George McGuire

(57) ABSTRACT

The present invention relates to methods and systems for electronic countermeasures, and particularly to methods and systems for electronic countermeasures that employ radar jamming devices.

13 Claims, 2 Drawing Sheets

PASSIVE LISTENING PULSE ADAPTIVE SIDELOBE CANCELLER

RELATED APPLICATION DATA

The present application claims the benefit of U.S. provisional patent application No. 61/800,062, filed Mar. 15, 2013, and is hereby incorporated by reference in its entirety.

GOVERNMENT RIGHTS

The invention was conceived or reduced to practice under U.S. Government Contract Name EQ36 Increment 2 (Electronic Attack), Project Number DO277. The US Government may have limited rights to practice the invention.

BACKGROUND OF THE INVENTION

1. Field of Invention

The present invention relates to methods and systems for electronic countermeasures, and particularly to methods and systems for electronic countermeasures that employ radar jamming devices.

2. Description of the Related Art

The word "radar" is an acronym for Radio Detection and Ranging that was coined by the U.S. Navy in the 1940's when the technology was in its infancy. Essentially, a radar system is one that alternately transmits radio frequency (RF) signals into a given search volume and then listens for reflections. By properly processing the radar returns, a radar system can determine the direction, range, altitude and/or speed of a target. Currently, radar is used in a wide variety of different ways. For example, weather researchers use radar to track rain and snow storms. Police use radar to determine the speed of motorists. Civil aviation uses radar for air traffic control purposes. The military uses radar to track aircraft, ships, terrain and missiles. Needless to say, this is a small list of examples.

For example, when military aircraft enter the airspace of a hostile power or nation, there is a high probability that they will come under surveillance by one or more enemy radars and thus become a target for radar guided weapons such as missiles, fighter aircraft, cannon, and other such weapons. In light of this threat, military aircraft must be equipped with effective electronic countermeasures and stealth mechanisms to prevent being detected, intercepted, and/or destroyed.

One type of countermeasure that is routinely used is commonly referred to as "jamming." Briefly stated, jamming refers to the use of RF signals to interfere with the hostile radar system's ability to detect and track targets. The jamming signal is designed to deceive or disable the hostile radar receiver. Jamming signals may be directed toward the main radar beam or the radar side lobes. Note that a target is detected when the RF energy of the main lobe hits the target and is reflected back to the radar receiver. Thus, the jammer must be aligned with the main lobe of the radar when main lobe jamming is performed. For side lobe jamming, the jammer is off-axis and aligned with the radar side lobes. The jamming is nonetheless effective because it disrupts the radar processing and may result in the radar detecting false targets. Another type of jamming is referred to as barrage jamming in which jamming signals consist of broadband noise. In response to jamming countermeasures, radar systems are now equipped with their own counter-countermeasures to defeat various types of jamming systems as well as other sources of interference.

For example, some radar systems have "adaptive sidelobe canceling" capabilities. Often, the radar system will include an auxiliary antenna that is configured to receive and process jamming signals. Essentially, the jamming signal in the radar main antenna channel and that in the auxiliary channel are applied in determining combining weights that upon application to received signals cancels the jamming without degrading the target return signal. Another approach that is used to neutralize a jammer, and other coherent interference, is referred to as blanking. A blanker also includes a dedicated receive antenna and the object is to reduce or eliminate the effects of sidelobe signals that mimic the radar waveform. Essentially, if the processor determines that the sidelobe signal exceeds the main beam signal, the signal output obtained from the main beam is rejected (blanked).

Indeed, jammers are used as an electronic counter measure ("ECM") technique to degrade radar sensitivity performance by effectively raising the noise floor through the sidelobes of receive beams. However, jammer energy entering through the receive beam sidelobes is particularly challenging because it varies as a function of angle relative to the jammer. This requires a separate cancellation filter to be calculated and applied for each predefined scan beam angle, and more importantly for each arbitrary track beam angle.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

Accordingly, there is a continued need for sidelobe cancellation systems and methods that account for and surmount the limitations inherent in current systems.

SUMMARY OF THE INVENTION

Various embodiments of the present invention may exhibit one or more of the following objects, features and/or advantages:

It is a principal object and advantage to provide methods and systems for ECM techniques to degrade radar sensitivity performance.

It is another object and advantage to provide methods and systems for sidelobe cancellation that provide the adaptive canceller with an improved estimate of the jammer cancellation weights.

In accordance with the foregoing principal object and advantage, an embodiment of the present invention is directed to computer implemented method for filtering out or cancelling at least one jamming signal sourced from a jammer aligned with or directed to a radar's sidelobes, the method including, but not limited to: calculating, by a processor, at least one adaptive sidelobe canceller weight on a coherent processing interval ("CPI") basis during at least one receive only or passive listening pulse at the radar's sidelobes; and applying, by a processor, the at least one adaptive sidelobe canceller weight to subsequent active pulses of the same CPI at the radar's sidelobes to filter out or cancel the jamming signal.

In accordance with an additional embodiment of the present invention, there is provided a non-transitory computer-readable storage medium containing program code including, but not limited to: program code for calculating at least one adaptive sidelobe canceller weight on a coherent processing interval ("CPI") basis during at least one receive only or passive listening pulse at the radar's sidelobes; and program code for applying the at least one adaptive sidelobe canceller weight to subsequent active pulses of the same CPI at the radar's sidelobes to filter out or cancel said jamming signal.

In accordance with an additional embodiment of the present invention, there is provided a device and system incorporating one or more elements of the method and/or the non-transitory computer-readable storage medium containing program code discussed above.

BRIEF DESCRIPTION OF THE DRAWINGS

The present invention will be more fully understood and appreciated by reading the following Detailed Description in conjunction with the accompanying drawings, in which.

DETAILED DESCRIPTION

According to an embodiment are methods and architectures for real-time calculation of adaptive sidelobe canceller weights on a coherent processing interval ("CPI") basis during a passive listening (receive only) pulse, with weights to be applied for subsequent pulses of that same CPI. The Passive Listening Pulse Adaptive Sidelobe Canceller Implementation provides several distinct advantages over other known methods of sidelobe cancellation.

A method for sidelobe cancellation can comprise, for example, detection in which each dwell requires a passive listening pulse when sidelobe cancellation is enabled (both search and track dwells). According to an embodiment, VHDL (VHSIC hardware description language) is then used to calculate the weights by performing the correlation and matrix inversion operation, and the VHDL then applies the weights to the data stream. The weights can be applied, for example, using a filter residing in the VHDL.

According to an embodiment, the adaptive canceller weights are calculated during the first few pulses of the CPI. These pulses are receive only (or passive listening) pulses. This provides the adaptive canceller with an improved estimate of the jammer cancellation weights because the weight calculations are based on the current state of the jammer inclusive of the actual angle of the jammer relative to the receive beam.

Figure 1:
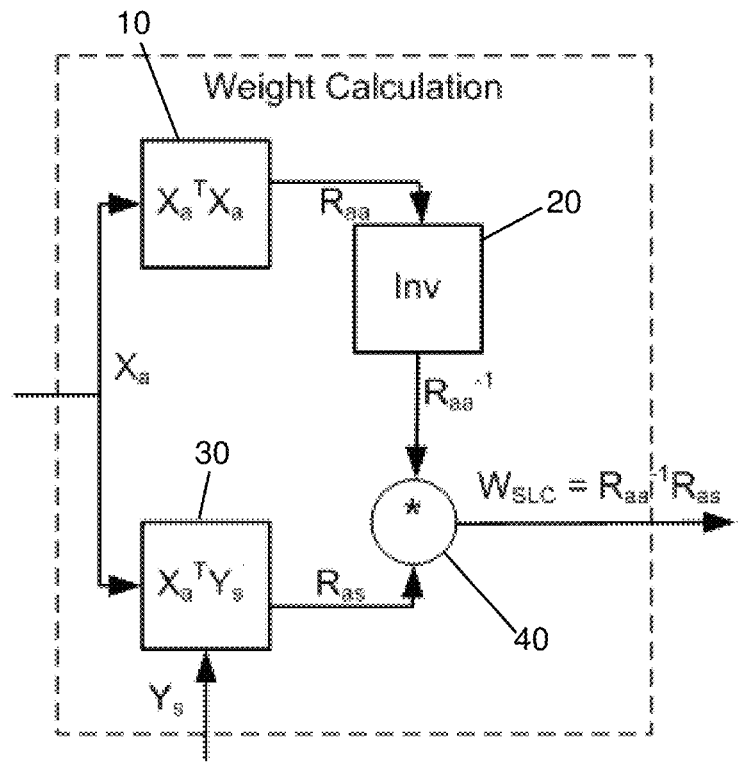
FIG. 1 is a diagrammatic illustration of weight calculation, according to an embodiment of the present invention.
Figure 3:
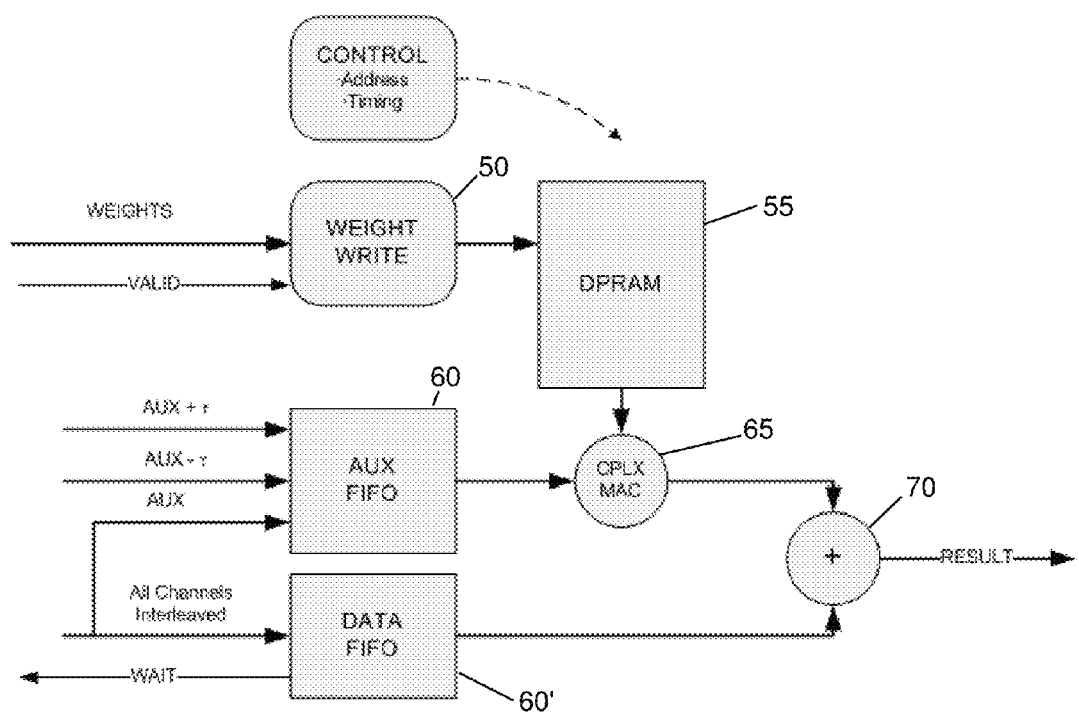
FIG. 3 is a further diagrammatic illustration of weight application, according to an embodiment of the present invention.

According to another embodiment, the weights are calculated independently for each of the three (upper, middle, lower) sum beams to further improve beam to beam angle variations relative to the jammer. The weights are then immediately applied during the remaining active pulses of the CPI to filter out (or cancel) the signal sourced by the jammer to mitigate the impact of the jammer on radar system performance. An example of Weight Calculation is depicted in FIG. 1, and an example of Weight Application is depicted in FIG. 3, although other embodiments are possible.

According to yet another embodiment, the methods or systems described herein use a matrix inversion calculation required for weight calculation. Inversion is performed using the following equations:

Given the 3×3 matrix M:

$$M = \begin{bmatrix} a & b & c \\ d & e & f \\ g & h & i \end{bmatrix} \quad M^T = \begin{bmatrix} a & d & g \\ b & e & h \\ c & f & i \end{bmatrix}$$

The inversion algorithm calculates $M^{-1}$:

$$M^{-1} = \frac{1}{det(M)}(adj(M))$$

$$det(M) = a(ci - fh) + b(fg - di) + c(dh - eg)$$

$$adj(M) = \begin{bmatrix} ei - fh & ch - bi & bf - ce \\ fg - di & ai - cg & cd - af \\ dh - eg & bg - ah & ac - bd \end{bmatrix}$$

where adj. is the adjoint, det is the determinant, and a-i represent the elements of matrix M.

FIG. 1 is a diagrammatic illustration showing the implementation of the weight calculation shown in the equations above, according to an embodiment of the present invention. As shown in FIG. 1, there are two inputs $X_a$ and $Y_s$. $X_a$ is a matrix containing AUX data and its associated fast time tap data (AUX+t, AUX−t). $Y_s$ is a matrix containing data for each of the three (upper, middle, lower) beams. The upper box 20 shows the equation for calculating the covariance of matrix $X_a$, and the result is labeled $R_{aa}$. The inverse of that matrix is calculated next in box 20, giving $R_{aa}^{-1}$. The lower box 30 shows the equation for calculating the cross-variance between $X_a$ and $Y_s$. The result of the cross-variance calculation, $R_{as}$, is multiplied with the inverse covariance calculation, $R_{aa}^{-1}$ at 40 to give the sidelobe canceller weights, $W_{SLC}$.

Figure 2:
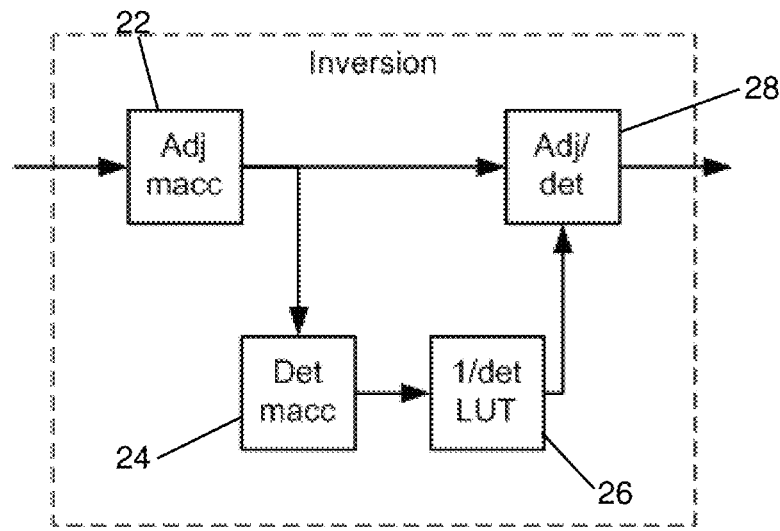
FIG. 2 is a diagrammatic illustration of the INV box shown in FIG. 1, according to an embodiment of the present invention.

FIG. 2 is a diagrammatic illustration of the INV box 20 shown in FIG. 1, according to an embodiment of the present invention. FIG. 2 takes $R_{aa}$ as an input. The first step is to calculate the adjoint matrix at 22. From the adjoint matrix, the determinant can be calculated at 24. The result of the determinant calculation is used as an address into a Look-Up-Table to obtain the result of 1/determinant at 26. Finally, the adjoint matrix is multiplied by 1/determinant, resulting in $R_{aa}^{-1}$, the inverse covariance matrix at 28. The formulas for calculating the adjoint matrix and determinant are shown in the inversion equations shown above.

Turning to FIG. 3, the complex weights generated by the operations performed in FIGS. 1-2 are passed into the "Weight Write" function/module 50 which temporarily stores the weights in a Dual Port RAM (DPRAM) 55. The AUX data channel and its associated fast time tap data (AUX+t, Aux−t) as well as the sum and difference channels are temporarily stored in first-in-first-out (FIFO) memories 60/60' to delay and align the data. The weights and associated Aux data are read from their respective memories and a complex multiply is performed (CPLX MAC module) 65. The results of that operation are then combined with their respective sum and difference channel data using a complex add ("+") 70. All of these steps are orchestrated by the "Control" block/module shown in the figure.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

A "module," as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, completely or partly on the thermal printer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more of the Figures illustrate the architecture, functionality, and/or operation of possible implementations of systems, methods, and computer program products according to various embodiments of the present invention. In this regard, each Figure may represent a module, segment, or portion of code, which comprises instructions for implementing the specified logical function(s). It should also be noted that, in some alternative implementations, the functions noted/illustrated in the Figures may occur out of the order noted in the figures, substantially concurrently, or in the reverse order, depending upon the functionality involved. It will also be noted that the functionality shown in the Figures can be implemented by special purpose hardware-based systems that perform the specified functions or acts, or combinations of special purpose hardware and computer instructions.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for filtering out or cancelling at least one jamming signal sourced from a jammer aligned with or directed to a radar's sidelobes, the method comprising the steps of:
    calculating at least one adaptive sidelobe canceller weight on a coherent processing interval ("CPI") basis during at least one receive only or passive listening pulse at the radar's sidelobes, wherein the step of calculating the at least one adaptive sidelobe canceller weight is performed by a field programmable gate array and includes the step of performing a 3×3 matrix inversion and
    applying said at least one adaptive sidelobe canceller weight to subsequent active pulses of the same CPI at the radar's sidelobes to filter out or cancel said jamming signal.

2. The method of claim 1, wherein the step of calculating is performed in real time.

3. The method of claim 2, wherein the step of calculating further comprises the step of basing the adaptive sidelobe canceller weight calculation on the current state of the jamming signal inclusive of the actual angle of the jammer relative to the receive only pulse.

4. The method of claim 1, wherein the step of calculating further comprises the step of independently calculating said at least one adaptive sidelobe canceller weight for each of three sum beams, wherein said sum beams comprise an upper, middle and lower sum beam, to further improve beam to beam angle variations relative to the jammer.

5. The method of claim 1, wherein the step of calculating further comprises the step of performing sidelobe canceller weight calculation using the following equation:

$$W_{slc} = R_{aa}^{-1} R_{as}$$

where $R_{aa} = X_a^T X_a^*$ and $R_{as} = X_a^T Y_s^*$ where $X_a$ is a matrix of auxiliary channel data and $Y_s$ is a matrix of sum channel data, $^{-1}$ is the inverse matrix, $^T$ is the transpose matrix, and * is the complex conjugate matrix.

6. The method of claim 5, wherein the step of calculating further comprises the step of performing a matrix inversion calculation using the following equations:

Given the 3×3 matrix M:

$$M = \begin{bmatrix} a & b & c \\ d & e & f \\ g & h & i \end{bmatrix} \quad M^T = \begin{bmatrix} a & d & g \\ b & e & h \\ c & f & i \end{bmatrix}$$

The inversion algorithm calculates $M^{-1}$:

$$M^{-1} = \frac{1}{det(M)}(adj(M))$$

$$det(M) = a(ci - fh) + b(fg - di) + c(dh - eg)$$

$$adj(M) = \begin{bmatrix} ei - fh & ch - bi & bf - ce \\ fg - di & ai - cg & cd - af \\ dh - eg & bg - ah & ac - bd \end{bmatrix}$$

where adj. is the adjoint, det is the determinant, and a-i represent the elements of matrix M.

7. The method of claim 6, wherein the step of applying further comprises the step of applying the calculated sidelobe canceller weight $W_{slc}$ to a real-time input data stream comprising auxiliary and main beam channels to filter out, or cancel the jamming signal by performing complex multiplication with the calculated sidelobe canceller weight $W_{slc}$, auxiliary channel data (AUX) and its associated fast time taps (AUX+τ and AUX−τ), and applying results of the complex multiplication with respective sum and difference channel data using complex addition.

8. A non-transitory computer-readable storage medium containing program code, wherein said program code is a hardware description language, comprising:

program code for calculating at least one adaptive sidelobe canceller weight on a coherent processing interval ("CPI") basis during at least one receive only or passive listening pulse at a radar's sidelobes, wherein the program code for calculating the at least one adaptive sidelobe canceller weight, applies the following equation:

$$W_{slc} = R_{aa}^{-1} R_{as}$$

where $R_{aa} = X_a^T X_a^*$ and $R_{as} = X_a^T Y_s^*$ where $X_a$ is a matrix of auxiliary channel data and $Y_s$ is a matrix of sum channel data, $^{-1}$ is the inverse matrix, $^T$ is the transpose matrix, and * is the complex conjugate matrix program code for applying said at least one adaptive sidelobe canceller weight to subsequent active pulses of the same CPI at the radar's sidelobes to filter out or cancel a jamming signal.

9. The non-transitory computer-readable storage medium of claim 8, wherein the program code for calculating further comprises program code for calculating said at least one adaptive sidelobe canceller weight in real time.

10. The non-transitory computer-readable storage medium of claim 9, further comprising program code for basing the adaptive sidelobe canceller weight calculation on the current state of the jamming signal inclusive of the actual angle of the jammer relative to the receive only pulse.

11. The non-transitory computer-readable storage medium of claim 8, wherein the program code for calculating further comprises program code for independently calculating said at least one adaptive sidelobe canceller weight for each of three sum beams, wherein said sum beams comprise an upper, middle and lower sum beam, to further improve beam to beam angle variations relative to the jammer.

12. The non-transitory computer-readable storage medium of claim 8, further comprising program code for performing a matrix inversion calculation using the following equations:

Given the 3×3 matrix M:

$$M = \begin{bmatrix} a & b & c \\ d & e & f \\ g & h & i \end{bmatrix} \quad M^T = \begin{bmatrix} a & d & g \\ b & e & h \\ c & f & i \end{bmatrix}$$

The inversion algorithm calculates $M^{-1}$:

$$M^{-1} = \frac{1}{det(M)}(adj(M))$$

$$det(M) = a(ci - fh) + b(fg - di) + c(dh - eg)$$

$$adj(M) = \begin{bmatrix} ei - fh & ch - bi & bf - ce \\ fg - di & ai - cg & cd - af \\ dh - eg & bg - ah & ac - bd \end{bmatrix}$$

where adj. is the adjoint, det is the determinant, and a-i represent the elements of matrix M.

13. The non-transitory computer-readable storage medium of claim 8, further comprising program code for applying the calculated sidelobe canceller weight $W_{slc}$ to a real-time input data stream comprising auxiliary and main beam channels to filter out, or cancel the jamming signal by performing complex multiplication with the calculated sidelobe canceller weight $W_{slc}$, auxiliary channel data (AUX) and its associated fast time taps (AUX+τ and AUX−τ), and applying results of the complex multiplication with respective sum and difference channel data using complex addition.

* * * * *